(12) United States Patent
Farrand et al.

(10) Patent No.: US 7,534,474 B2
(45) Date of Patent: *May 19, 2009

(54) MULTIREACTIVE POLYMERIZABLE MESOGENIC COMPOUNDS

(75) Inventors: Louise Farrand, Manchester (GB); David Coates, Dorset (GB)

(73) Assignee: Merck Patent Gesellschaft mit beschrankter Haftung, Darmstadt (DE)

( * ) Notice: Subject to any disclaimer, the term of this patent is extended or adjusted under 35 U.S.C. 154(b) by 38 days.

This patent is subject to a terminal disclaimer.

(21) Appl. No.: 11/517,300

(22) Filed: Sep. 8, 2006

(65) Prior Publication Data

US 2007/0009675 A1    Jan. 11, 2007

Related U.S. Application Data

(62) Division of application No. 11/059,551, filed on Feb. 17, 2005, now Pat. No. 7,125,500, which is a division of application No. 09/654,516, filed on Sep. 1, 2000, now Pat. No. 7,060,200.

(30) Foreign Application Priority Data

Sep. 3, 1999    (EP) .................................. 99116849

(51) Int. Cl.
    *C09K 19/38* (2006.01)
    *C09K 19/30* (2006.01)
    *C09K 19/32* (2006.01)
    *C09K 19/34* (2006.01)
    *C09K 19/20* (2006.01)

(52) U.S. Cl. .................... 428/1.1; 428/1.3; 252/299.61; 252/299.62; 252/299.63; 252/299.65; 252/299.67

(58) Field of Classification Search ............ 252/299.01, 252/299.5, 299.61, 299.62, 299.63, 299.65, 252/299.67; 428/1.1, 1.3
See application file for complete search history.

(56) References Cited

U.S. PATENT DOCUMENTS

| | | | | |
|---|---|---|---|---|
| 5,560,864 A | * | 10/1996 | Goulding | ............... 252/299.01 |
| 5,723,066 A | | 3/1998 | Coates et al. | |
| 5,746,938 A | | 5/1998 | Coates et al. | |
| 5,750,213 A | | 5/1998 | Onishi et al. | |
| 5,798,147 A | * | 8/1998 | Beck et al. | ................... 427/511 |
| 5,871,665 A | | 2/1999 | Coates et al. | |
| 7,060,200 B1 | * | 6/2006 | Farrand et al. | ......... 252/299.01 |
| 7,125,500 B2 | * | 10/2006 | Farrand et al. | ......... 252/299.01 |

* cited by examiner

*Primary Examiner*—Shean C Wu
(74) *Attorney, Agent, or Firm*—Millen, White, Zelano, Branigan, P.C.

(57) ABSTRACT

The invention relates to multireactive polymerizable mesogenic compounds of formula I $$R^1\text{-MG-}R^2 \qquad \qquad I$$

wherein $R^1$, $R^2$ and MG have the meaning given in claim 1, to a polymerizable mesogenic composition comprising at least two components, at least one which is a compound of formula I, to a linear or crosslinked polymer obtainable by polymerization of one or more compounds of formula I or of a polymerizable composition comprising one or more compounds of formula I and to the use of a compound of formula I, or a polymerizable composition or polymer obtainable thereof, in optical elements such as polarizers, optical retardation or compensation films, alignment layers, colour filters or holographic elements, in liquid crystal displays such as PDLC, polymer gel or polymer stabilized cholesteric texture (PSCT) displays, in adhesives, synthetic resins with anisotropic mechanical properties, cosmetics, diagnostics or liquid crystal pigments, for decorative and security applications, and for nonlinear optics or optical information storage.

19 Claims, No Drawings

MULTIREACTIVE POLYMERIZABLE MESOGENIC COMPOUNDS

This application is a divisional of U.S. Ser. No. 11/059,551, filed Feb. 17, 2005 now U.S. Pat. No. 7,125,500, which is a divisional of U.S. Ser. No. 09/654,516, filed Sep. 1, 2000, now U.S. Pat. No. 7,060,200.

The invention relates to multireactive polymerizable mesogenic compounds, to polymerizable liquid crystal compositions comprising the multireactive compounds, to linear or crosslinked liquid crystal polymers obtainable from the multireactive compounds and the compositions comprising them, and to the use of the multireactive polymerizable mesogenic compounds, the polymerizable compositions and polymers obtained therefrom in optical elements, liquid crystal displays, adhesives, synthetic resins with anisotropic mechanical properties, cosmetics, diagnostics, liquid crystal pigments, decorative and security applications, nonlinear optics and optical information storage.

BACKGROUND OF THE INVENTION

Polymerizable mesogenic compounds, which are also known as reactive mesogenic compounds, have been described in prior art for various purposes. For example, they can be aligned in their liquid crystal phase and subsequently polymerized in situ to give linear or crosslinked liquid crystal polymer films with uniform orientation of high quality. These films can be used for example as optical elements, like polarization filters as described in EP 0 397 263, broadband circular polarizers as described in EP 0 606 940 and WO 97/35219, or compensation or retardation films as described in WO 98/00475, WO 98/04651 or WO 98/12584.

For many applications it is preferred to use crosslinked polymer films, as these show higher stability and lower temperature dependence of the optical properties, compared to films of linear polymers.

For this purpose, often polymerizable compositions are used which typically comprise a mixture of direactive and monoreactive polymerizable mesogenic compounds.

The terms reactive or polymerizable mesogenic compound as used in the foregoing and the following comprise compounds with a rod-shaped, lath-shaped or disk-shaped mesogenic group, i.e. a group with the ability to induce mesophase behaviour. These compounds do not necessarily have to exhibit mesophase behaviour by themselves. It is also possible that these compounds show mesophase behaviour only in mixtures with other compounds or when the polymerizable mesogenic compounds or the mixtures comprising them are polymerized.

A di- or multireactive compound in this connection means a compound having a mesogenic group and two or more polymerizable terminal groups attached to one or both sides of the mesogenic group, either directly or via a spacer group. A monoreactive compound means a compound having a mesogenic group, to one side of which is attached a polymerizable terminal group, either directly or via a spacer, and to the other side of which is attached a non-polymerizable terminal group, like e.g. a polar group such as halogen or cyano or a chiral or achiral alkyl or alkoxy group.

A typical example of a direactive polymerizable mesogenic compound of the prior art is compound (A)

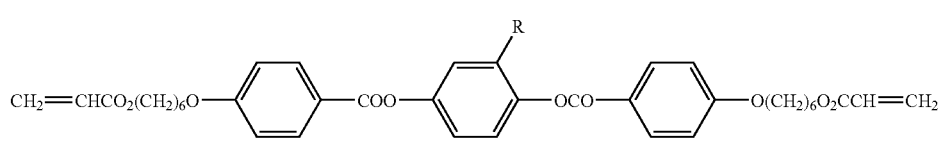

(A)

wherein R is H or CH$_3$, which is described in EP 0 331 233 and in D. J. Broer et al., Makromol. Chem. 190, 2255-2268 (1989).

Typical examples of monoreactive polymerizable mesogenic compounds of the prior art are compounds (B) and (C)

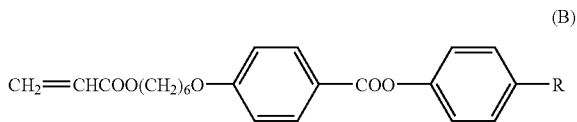

(B)

wherein R is e.g. CN or OCH$_3$, which is described in DE 27 22 589,

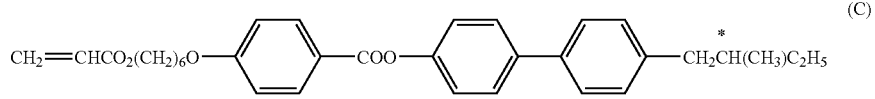

(C)

which is described in DE 195,04,224.

SUMMARY OF THE INVENTION

When preparing polymerizable mesogenic compositions it is possible, by varying the ratio of mono- and direactive compounds, to control the degree of crosslinking of the resulting polymer film, and thereby to tune its physical and chemical properties such as the glass transition temperature (in case of low or medium degree of crosslinking), the temperature dependence of the optical properties, the thermal and mechanical stability, and the stability against organic solvents.

Furthermore, by varying the terminal group of the monoreactive polymerizable mesogenic compound, it is possible to control the optical properties of the polymerizable mixture and the resulting film. For example, a helically twisted structure can be induced in the mixture and the film by using compounds with a chiral terminal group. Furthermore, the inventors have found that it is possible in a polymerizable mesogenic mixture to control the orientation of the mesogenic compounds on a substrate or on a free surface by using compounds with polar and unpolar terminal groups in varying ratios.

In light of what was said above, it would be desirable to have available polymerizable mesogenic compounds that, when used in a polymerizable mixture, allow control, at the same time of the degree of crosslinking and the optical properties of the resulting polymer film.

Furthermore, regarding the broad range of applications for polymerizable mesogenic compounds it is desirable for the expert to have available further compounds of this type which are easy to synthesize and fulfill the various requirements as described above.

The inventors have found that the above aims can be achieved by providing multireactive polymerizable mesogenic compounds according to the present invention.

The inventive compounds comprise two or more polymerizable groups attached to the same side of a mesogenic core, whereas to the other side of the mesogenic core there can be attached one or more polymerizable groups or a non-polymerizable terminal group, like e.g. a polar or unpolar group or a chiral or achiral group.

Thus, when adding multireactive compounds according to the present invention to a polymerizable mixture, the degree of crosslinking of the resulting polymer film is increased. At the same time it is possible to tailor the optical properties of the mixture and the polymer film by using an inventive multireactive compound with an appropriately selected terminal group at its free end.

The term 'free end' in this connection denotes the side of the mesogenic group of the inventive mesogenic compounds where no polymerizable group is attached. Thus, when using inventive compounds in a polymerizable mixture it is possible inter alia

- to control the alignment of the mixture on a substrate or on a free surface by using inventive compounds with polar and unpolar terminal groups at their free end in a specific ratio,
- to induce a helically twisted liquid crystal phase, such as a cholesteric or chiral phase, in the mixture by using an inventive compound with a chiral terminal group at its free end,
- to increase the birefringence of the mixture by using an inventive compound with a highly birefringent terminal group at its free end,
- to increase the dielectric anisotropy of the mixture by using an inventive compound with a polar terminal group at its free end, while the two or more polymerizable groups at the opposite end of the mesogenic core contribute to the crosslinking of the polymer.

The inventive multireactive compounds wherein only one side of the mesogenic group carries polymerizable groups, i.e. the other side is a free end, provide an additional benefit. In a polymerized film the free end of an inventive multireactive polymerizable compound will not be connected to the polymer backbone, in contrast e.g. to the direactive prior art compound (A) above, wherein both ends of the mesogenic core will be connected to the polymer backbone. As a consequence, the motions of the mesogenic groups of inventive compounds are less restricted by the polymer backbone during formation of the polymer network. This gives better alignment of the mesogenic groups and makes it easier to achieve uniform macroscopic orientation in a mixture comprising the inventive compounds.

On the other hand, inventive compounds carrying two or more polymerizable groups on each side of the mesogenic core are also advantageous, as these compounds give more densely crosslinked polymer networks with increased stability against heat, solvents and mechanical stress, and wherein the uniform macroscopic orientation is more stable. Also, in case of these compounds a smaller amount is needed in a polymerizable mixture to obtain a densely crosslinked film, compared e.g. to direactive compounds of prior art, such as the above shown compound (A).

U.S. Pat. No. 5,750,213 discloses multireactive compounds of the formula

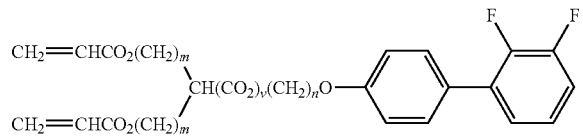

wherein m is 1, 6 or 12, n is 0, 6, 7, 11, 13 or 16 and v is 0 or 1. However, the compounds disclosed in U.S. Pat. No. 5,750,213 are not substituted in p-position of the biphenyl group. They do not show a liquid crystal phase and are liquid at room temperature. These are serious drawbacks for the use in polymerizable LC mixtures, since compounds without a liquid crystal phase lower the clearing point of a liquid crystal mixture, and liquid polymerizable compounds show increased tendency towards spontaneous polymerization compared to solid compounds, therefore they are less stable for storage, and increased amounts of stabilizers are needed to prevent undesired polymerization during storage.

One object of the present invention is multireactive polymerizable mesogenic compounds of formula I $$R^1\text{-MG-}R^2 \qquad\qquad I$$

wherein $R^1$ is halogen, CN, OCN, NCS, $NO_2$ or a chiral or achiral alkyl radical with 1 to 30 C atoms which may be unsubstituted, mono- or polysubstituted by halogen or CN, it being also possible for one or more non-adjacent $CH_2$ groups to be replaced, in each case independently from one another, by —O—, —S—, —NH—, —N($CH_3$)—, —CO—, —COO—, —OCO—, —OCO—O—, —S—CO—, —CO—S—, —CH=CH— or —C≡C— in such a manner that oxygen atoms are not linked directly to one another, or alternatively $R^1$ has one of the meanings of $R^2$ or is denoting P—(Sp-X)$_n$—, P is a polymerizable group, Sp is a spacer group with 1 to 25 C atoms, X is —O—, —S—, —CO—, —COO—, —OCO—, —OCO—O—, —CO—NH—, —NH—CO—, —OCH$_2$—, —CH$_2$O—, —SCH$_2$—, —CH$_2$S—, —CH=CH—COO—, —OOC—CH=CH— or a single bond, n is 0 or 1, MG is a mesogenic group, and $R^2$ is straight-chain or branched alkyl with 1 to 25 C atoms which may be unsubstituted, mono- or polysubstituted by halogen or CN, it being also possible for one or more non-adjacent $CH_2$ groups to be replaced, in each case independently from one another, by —O—, —S—, —NH—, —N($CH_3$)—, —CO—, —COO—, —OCO—, —OCO—O—, —S—CO—, —CO—S—, —CH=CH— or —C≡C— in such a manner that oxygen atoms are not linked directly to one another, and which is substituted with at least two-identical or different groups P.

Another object of the invention is a polymerizable mesogenic composition comprising at least two components, at least one of which is a compound of formula I.

Another object of the invention is a linear or crosslinked polymer obtainable by polymerization of one or more compounds of formula I or of a polymerizable composition comprising one or more compounds of formula I.

Yet another object of the invention is the use of a compound of formula I, or a polymerizable composition or polymer obtainable therefrom, in optical elements such as polarizers, optical retardation or compensation films, alignment layers, colour filters or holographic elements, in liquid crystal displays such as PDLC, polymer gel or polymer stabilized cholesteric texture (PSCT) displays, in adhesives, synthetic resins with anisotropic mechanical properties, cosmetics, diagnostics or liquid crystal pigments, for decorative and security applications, and for nonlinear optics or optical information storage. Upon further study of the specification and appended claims, further objects and advantages of this invention will become apparent to those skilled in the art.

Particularly preferred are compounds of formula I wherein $R^1$ is a non-polymerizable group.

Further preferred are compounds of formula I wherein $R^1$ has one of the meanings of $R^2$. Of these compounds, very preferred are those wherein $R^1$ and $R^2$ have the same meaning.

Further preferred are compounds of formula I wherein MG is selected of formula II $$-(A^1-Z)_m-A^2-\qquad\qquad II$$

wherein

Z is in each case independently —O—, —S—, —CO—, —COO—, —OCO—, —CO—NH—, —NH—CO—, —$CH_2CH_2$—, —$OCH_2$—, —$CH_2O$—, —$SCH_2$—, —$CH_2S$—, —CH=CH—, —CH=CH—COO—, —OCO—CH=CH—, —C≡C— or a single bond, $A^1$ and $A^2$ are each independently 1,4-phenylene in which, in addition, one or more CH groups may be replaced by N, 1,4-cyclohexylene in which, in addition, one or two non-adjacent $CH_2$ groups may be replaced by O and/or S, 1,4-cyclohexenylene, 1,4-bicyclo(2,2,2)octylene, piperidine-1,4-diyl, naphthalene-2,6-diyl, decahydronaphthalene-2,6-diyl, or 1,2,3,4-tetrahydro-naphthalene-2,6-diyl, it being possible for all these groups to be unsubstituted, mono- or polysubstituted with F, Cl, OH, CN, $NO_2$ or alkyl, alkoxy, alkylcarbonyl or alkoxycarbonyl groups having 1 to 7 C atoms wherein one or more H atoms may be substituted by F or Cl, and m is 1, 2 or 3.

Further preferred are compounds of formula I wherein P is selected from $CH_2$=CW—COO—, WCH=CH—O—, $CH_2$=CH-Phenyl-(O)$_k$— and WHC—CH—, with W being H, $CH_3$ or Cl and k being 0 or 1.

Further preferred are compounds of formula I wherein $R^2$ is substituted with 2, 3, 4 or 5 identical or different polymerizable groups P.

Particularly preferably $R^2$ is selected from the following subformulae

| | |
|---|---|
| —X-alkyl-CHP$^1$—$CH_2$—$CH_2$P$^2$ | Ia |
| —X-alkyl-C($CH_2$P$^1$)($CH_2$P$^2$)—$CH_2$P$^3$ | Ib |
| —X-alkyl-CHP$^1$CHP$^2$—$CH_2$P$^3$ | Ic |
| —X-alkyl-C($CH_2$P$^1$)($CH_2$P$^2$)—$C_aH_{2a+1}$ | Id |
| —X-alkyl-CHP$^1$—$CH_2$P$^2$ | Ie |
| —X-alkyl-CHP$^1$P$^2$ | If |
| —X-alkyl-CP$^1$P$^2$—$C_aH_{2a+1}$ | Ig |
| —X-alkyl-C($CH_2$P$^1$)($CH_2$P$^2$)—$CH_2OCH_2$—C($CH_2$P$^3$)($CH_2$P$^4$)$CH_2$P$^5$ | Ih |
| —X-alkyl-CH(($CH_2$)$_a$P$^1$)(($CH_2$)$_b$P$^2$) | Ii |
| —X-alkyl-CHP$^1$CHP$^2$—$C_aH_{2a+1}$ | Ik | wherein alkyl is straight-chain or branched alkylene with 0 (i.e., a single bond) to 12 C atoms which may be unsubstituted, mono- or polysubstituted by halogen or CN, it being also possible for one or more non-adjacent $CH_2$ groups to be replaced, in each case independently from one another, by —O—, —S—, —NH—, —N($CH_3$)—, —CO—, —COO—, —OCO—, —OCO—O—, —S—CO—, —CO—S—, —CH=CH— or —C≡C— in such a manner that oxygen atoms are not linked directly to one another, a and b are identical or different integers from 0 to 6, X has one of the meanings of formula 1, and $P^1$ to $P^5$ have each independently one of the meanings of P given above.

In the above preferred subformulae alkyl is especially preferably —($CH_2$)$_c$—, with c being an integer from 0 to 12.

P and $P^1$ to $P^5$ in formula I and the preferred subformulae are especially preferably, independently of each other, acrylate, methacrylate, vinyl, vinyloxy, epoxy or p-vinylphenyloxy.

A smaller group of preferred mesogenic groups of formula II is listed below. For reasons of simplicity, Phe in these groups is 1,4-phenylene, PheL is a 1,4-phenylene group which is substituted by 1 to 4 groups L, with L being F, Cl, CN, OH, $NO_2$ or an optionally fluorinated alkyl, alkoxy or alkanoyl group with 1 to 7 C atoms, and L Cyc is 1,4-cyclohexylene. The following list of preferred mesogenic groups comprises the subformulae II-1 to II-25 as well as their mirror images

| | |
|---|---|
| -Phe-Z-Phe- | II-1 |
| -Phe-Z-Cyc- | II-2 |
| -Cyc-Z-Cyc- | II-3 |
| -PheL-Z-Phe- | II-4 |
| -PheL-Z-Cyc- | II-5 |
| -PheL-Z-PheL- | II-6 |
| -Phe-Z-Phe-Z-Phe- | II-7 |
| -Phe-Z-Phe-Z-Cyc- | II-8 |

-Phe-Z-Cyc-Z-Phe-  II-9
-Cyc-Z-Phe-Z-Cyc-  II-10
-Phe-Z-Cyc-Z-Cyc-  II-11
-Cyc-Z-Cyc-Z-Cyc-  II-12
-Phe-Z-Phe-Z-PheL-  II-13
-Phe-Z-PheL-Z-Phe-  II-14
-PheL-Z-Phe-Z-Phe-  II-15
-PheL-Z-Phe-Z-PheL-  II-16
-PheL-Z-PheL-Z-Phe-  II-17
-PheL-Z-PheL-Z-PheL-  II-18
-Phe-Z-PheL-Z-Cyc-  II-19
-Phe-Z-Cyc-Z-PheL-  II-20
-Cyc-Z-Phe-Z-PheL-  II-21
-PheL-Z-Cyc-Z-PheL-  II-22
-PheL-Z-PheL-Z-Cyc-  II-23
-PheL-Z-Cyc-Z-Cyc-  II-24
-Cyc-Z-PheL-Z-Cyc-  II-25

Particularly preferred are the subformulae II-1, II-2, II-4, II-6, II-7, II-8, II-11, II-13, II-14, II-15 and II-16.

In these preferred groups Z in each case independently has one of the meanings of $Z^1$ as given in formula I. Preferably Z is —COO—, —OCO—, —CH$_2$CH$_2$—, —C≡C— or a single bond.

Very preferably the mesogenic group MG is selected from the following formulae and their mirror images

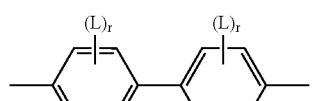

IIa

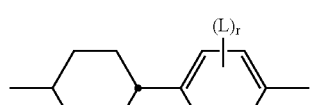

IIb

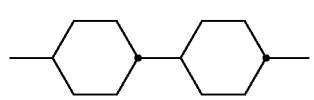

IIc

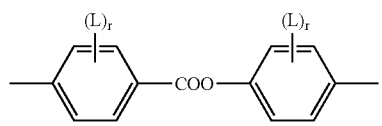

IId

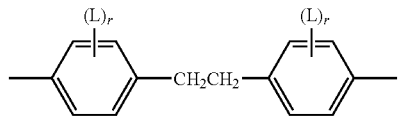

IIe

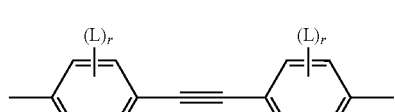

IIf

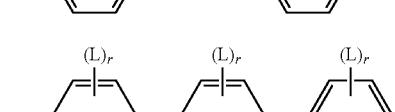

IIg

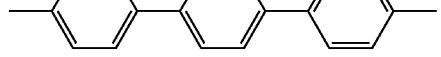

IIh

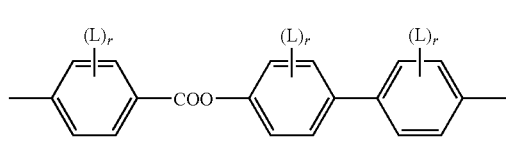

IIi

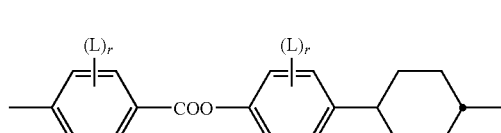

IIk

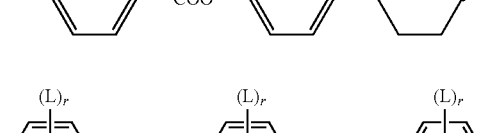

IIm

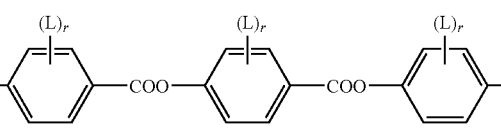

IIn

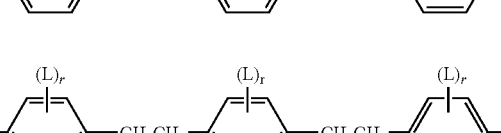

IIo

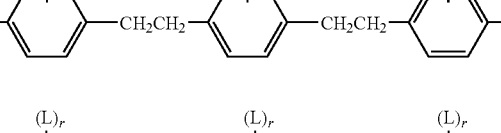

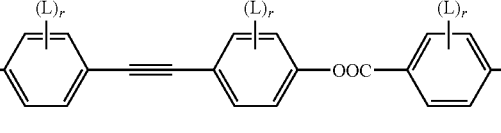

wherein L has the meaning given above and r is 0, 1 or 2.

The group

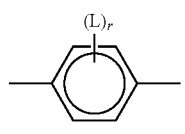

in these preferred formulae is very preferably denoting

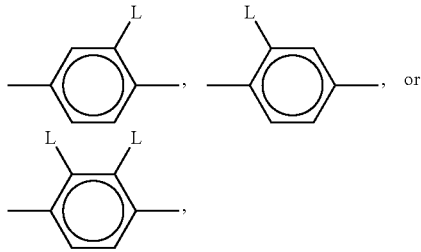, or furthermore

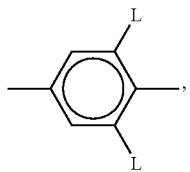, with L having each independently one of the meanings given above.

Particularly preferred are the subformulae IId, IIg, IIh, IIi, IIk and IIo, in particular the subformulae IId and IIk.

L is preferably F, Cl, CN, OH, NO$_2$, CH$_3$, C$_2$H$_5$, OCH$_3$, OC$_2$H$_5$, COCH$_3$, COC$_2$H$_5$, COOCH$_3$, COOC$_2$H$_5$, CF$_3$, OCF$_3$, OCHF$_2$, OC$_2$F$_5$, in particular F, Cl, CN, CH$_3$, C$_2$H$_5$, OCH$_3$, COCH$_3$ and OCF$_3$, most preferably F, Cl, CH$_3$, OCH$_3$ and COCH$_3$.

In the compounds of formula I R$^1$ may be a polar or unpolar group.

In case R$^1$ is a polar group, it is preferably selected from CN, NO$_2$, halogen, OCH$_3$, OCN, NCS, COR$^3$, COOR$^3$ or a mono-, oligo- or poly-fluorinated alkyl or alkoxy group with 1 to 4 C atoms. R$^3$ is optionally fluorinated alkyl with 1 to 4, preferably 1 to 3 C atoms. Halogen is preferably F or Cl. Especially preferably R$^1$ in these compounds is selected from F, Cl, CN, NO$_2$, OCH$_3$, COCH$_3$, COC$_2$H$_5$, COOCH$_3$, COOC$_2$H$_5$, CF$_3$, C$_2$F$_5$, OCF$_3$, OCHF$_2$, and OC$_2$F$_5$, in particular from F, Cl, CN, OCH$_3$ and OCF$_3$.

In case R$^1$ is an unpolar group, it is preferably alkyl with up to 15 C atoms or alkoxy with 2 to 15 C atoms.

If R$^1$ in formula I is an alkyl or alkoxy radical, i.e. where the terminal CH$_2$ group is replaced by —O—, this may be straight-chain or branched. It is preferably straight-chain, has 2, 3, 4, 5, 6, 7 or 8 carbon atoms and accordingly is preferably ethyl, propyl, butyl, pentyl, hexyl, heptyl, octyl, ethoxy, propoxy, butoxy, pentoxy, hexoxy, heptoxy, or octoxy, furthermore methyl, nonyl, decyl, undecyl, dodecyl, tridecyl, tetradecyl, pentadecyl, methoxy, nonoxy, decoxy, undecoxy, dodecoxy, tridecoxy or tetradecoxy, for example.

Oxaalkyl, i.e. where one CH$_2$ group is replaced by —O—, is preferably straight-chain 2-oxapropyl (=methoxymethyl), 2-(=ethoxymethyl) or 3-oxabutyl (=2-methoxyethyl), 2-, 3-, or 4-oxapentyl, 2-, 3-, 4-, or 5-oxahexyl, 2-, 3-, 4-, 5-, or 6-oxaheptyl, 2-, 3-, 4-, 5-, 6- or 7-oxaoctyl, 2-, 3-, 4-, 5-, 6-, 7- or 8-oxanonyl or 2-, 3-, 4-, 5-, 6-,7-, 8- or 9-oxadecyl, for example.

In the compounds of formula I R$^1$ may be an achiral or a chiral group. In case of a chiral group it is preferably selected according to the following formula III:

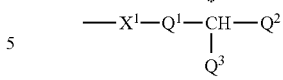

wherein

X$^1$ is —O—, —S—, —CO—, —COO—, —OCO—, —OCOO— or a single bond,

Q$^1$ is an alkylene or alkylene-oxy group with 1 to 10 C atoms or a single bond, Q$^2$ is an alkyl or alkoxy group with 1 to 10 C atoms which may be unsubstituted, mono- or polysubstituted by halogen or CN, it being also possible for one or more non-adjacent CH$_2$ groups to be replaced, in each case independently from one another, by —C≡C—, —O—, —S—, —NH—, —N(CH$_3$)—, —CO—, —COO—, —OCO—, —OCO—O—, —S—CO— or —CO—S— in such a manner that oxygen atoms are not linked directly to one another, Q$^3$ is halogen, a cyano group or an alkyl or alkoxy group with 1 to 4 C atoms different from Q$^2$.

In case Q$^1$ in formula III is an alkylene-oxy group, the O atom is preferably adjacent to the chiral C atom.

Preferred chiral groups R$^1$ are 2-butyl (=1-methylpropyl), 2-methylbutyl, 2-methylpentyl, 3-methylpentyl, 2-ethylhexyl, 2-propylpentyl, 2-octyl, in particular 2-methylbutyl, 2-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-nonyl, 2-decyl, 2-dodecyl, 6-methoxyoctoxy, 6-methyloctoxy, 6-methyloctanoyloxy, 5-methylheptyloxycarbonyl, 2-methylbutyryloxy, 3-methylvaleroyloxy, 4-methylhexanoyloxy, 2-chloropropionyloxy, 2-chloro-3-methylbutyryloxy, 2-chloro-4-methylvaleryloxy, 2-chloro-3-methylvaleryloxy, 2-methyl-3-oxapentyl, 2-methyl-3-oxahexyl, 1-methoxypropyl-2-oxy, 1-ethoxypropyl-2-oxy, 1-propoxypropyl-2-oxy, 1-butoxypropyl-2-oxy, 2-fluorooctyloxy, 2-fluorodecyloxy for example.

In addition, compounds of formula I containing an achiral branched group R$^1$ may occasionally be of importance, for example, due to a reduction in the tendency towards crystallization. Branched groups of this type generally do not contain more than one chain branch. Preferred achiral branched groups are isopropyl, isobutyl (=methylpropyl), isopentyl (=3-methylbutyl), isopropoxy, 2-methylpropoxy and 3-methylbutoxy.

Very preferably R$^1$ in formula I is halogen, cyano or an optionally fluorinated achiral or chiral alkyl or alkoxy group with 1 to 15 C atoms.

Another preferred embodiment of the present invention relates to compounds of formula I wherein R$^1$ is denoting P-(Sp-X)$_n$—.

P and P$^1$ to P$^5$ in formula I are preferably an acrylate group, a methacrylate group, a vinyl or vinyloxy group, an epoxy group, a styrene group or a propenyl ether group, in particular an acrylate, methacrylate, vinyl or epoxy group.

As for the spacer group Sp in formula I all groups can be used that are known for this purpose to the skilled in the art. The spacer group Sp is preferably a linear or branched alkylene group having 1 to 20 C atoms, in particular 1 to 12 C atoms, in which, in addition, one or more non-adjacent CH$_2$ groups may be replaced by —O—, —S—, —NH—, —N(CH$_3$)—, —CO—, —O—CO—, —S—CO—, —O—COO—, —CO—S—, —CO—O—, —CH(halogen)-, —CH(CN)—, —CH=CH— or —C≡C—.

Typical spacer groups are for example —(CH$_2$)$_o$—, —(CH$_2$CH$_2$O)$_p$—CH$_2$CH$_2$—, —CH$_2$CH$_2$—S—CH$_2$CH$_2$— or —CH$_2$CH$_2$—NH—CH$_2$CH$_2$—, with o being an integer from 2 to 12 and p being an integer from 1 to 3.

Preferred spacer groups are ethylene, propylene, butylene, pentylene, hexylene, heptylene, octylene, nonylene, decylene, undecylene, dodecylene, octadecylene, ethyleneoxyethylene, methyleneoxybutylene, ethylene-thioethylene, ethylene-N-methyliminoethylene, 1-methylalkylene, ethenylene, propenylene and butenylene for example.

Especially preferred are inventive compounds of formula I wherein Sp is denoting an alkyl or alkoxy group with 2 to 8 C atoms. Straight-chain alkyl or alkoxy groups are especially preferred.

In another preferred embodiment of the invention the chiral compounds of formula I comprise at least one spacer group Sp that is a chiral group of the formula IV:

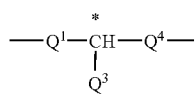

IV wherein

Q$^1$ and Q$^3$ have the meanings given in formula III, and

Q$^4$ is an alkylene or alkylene-oxy group with 1 to 10 C atoms or a single bond, being different from Q$^1$.

In the event that R is denoting P-Sp-X—, the two spacer groups Sp in the compounds of formula I may be identical or different.

Of the preferred compounds described above particularly preferred are those wherein n is 1.

In another preferred embodiment of the present invention R$^1$ is a terminal chiral group selected from the following groups an ethylenglycol derivative

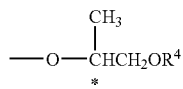

wherein R$^4$ is an alkyl radical with 1 to 12 C atoms, a group based on citronellol,

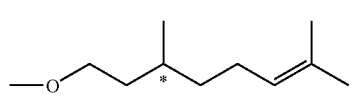

a cholesteryl group, a terpenoid radical as disclosed e.g. in WO 96/17901, preferably selected from menthyl, neomenthyl, campheyl, pineyl, terpineyl, isolongifolyl, fenchyl, carreyl, myrthenyl, nopyl, geraniyl, linaloyl, neryl, citronellyl and dihydrocitronellyl, particularly preferably menthyl, a group selected from menthone derivatives like

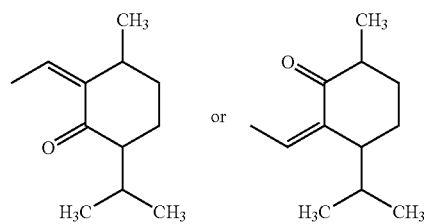

or a terminal chiral sugar derivative comprising a mono- or dicyclic radical with pyranose or furanose rings like, for example, a terminal group derived from the chiral sugars disclosed in WO 95/16007.

In another preferred embodiment of the present invention the mesogenic group MG has at least one center of chirality.

In these compounds MG is preferably selected of formula VI

-(A$^1$-Z)$_d$-G-(Z-A$^2$)$_e$-    VI wherein

A$^1$, A$^2$ and Z have the meaning given in formula II, d and e are independently of each other 0, 1 or 2, and G is a bivalent chiral group.

G in these compounds is preferably a chiral bivalent radical derived from sugars, binaphthyl derivatives, or optically active glycols, especially ethane-1,2-diol substituted in 1- and or 2-position with alkyl or aryl groups. In case of sugar groups, these are preferably selected from mono- and dicyclic groups comprising pentose or hexose rings.

Particularly preferred are the following groups G

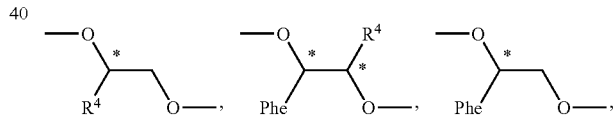

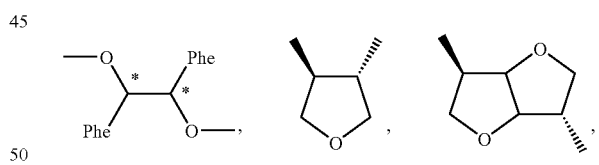

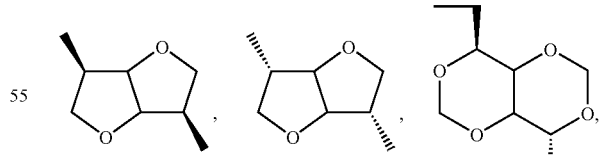

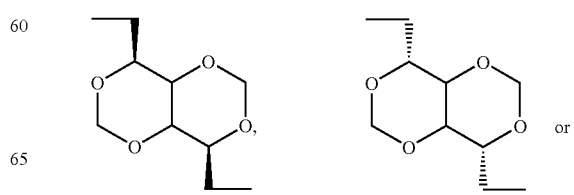

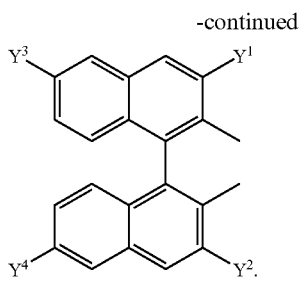

wherein Phe has the meaning given above, $R^4$ is F or optionally fluorinated alkyl with 1 to 4 C atoms and $Y^1$, $Y^2$, $Y^3$ and $Y^4$ have one of the meanings of $R^1$ in formula I.

Preferably G is dianhydrohexitol like dianhydrosorbitol

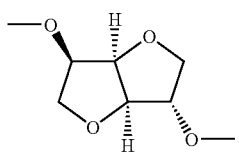

dianhydromannitol

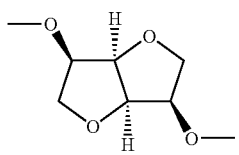

and dianhydroiditol

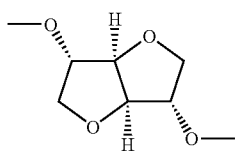

especially preferably dianhydrosorbitol, substituted ethane diol like

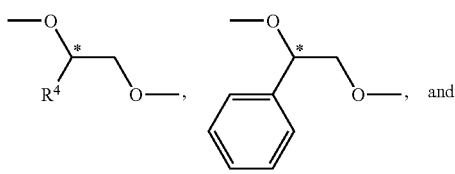

wherein $R^4$ is F, $CH_3$ or $CF_3$, or optionally substituted binaphthyl

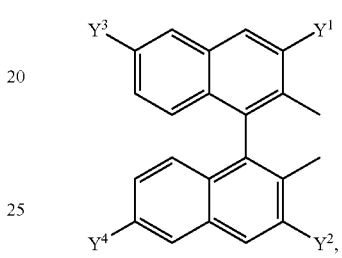

wherein $Y^1$, $Y^2$, $Y^3$ and $Y^4$ are H, F or optionally fluorinated alkyl with 1 to 8 C atoms.

The inventive compounds of formula I can be synthesized according to or in analogy to methods which are known per se and which are described in standard works of organic chemistry such as, for example, Houben-Weyl, Methoden der organischen Chemie, Thieme-Verlag, Stuttgart. Some specific methods of preparation can be taken from the examples.

Furthermore, compounds of formula I wherein $R^2$ is selected of the preferred subformulae Ia to Ik can be prepared according to or in analogy to the reaction schemes 1 to 14 given below, followed by attaching polymerizable groups to the terminal OH groups by esterification or etherification according to known methods.

Scheme 1

Compounds according to subformula Ia

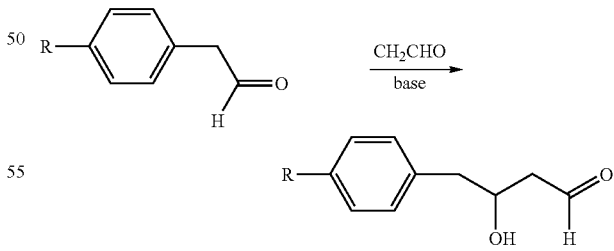

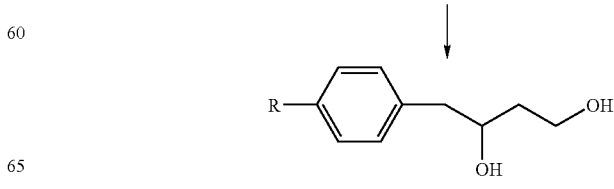

Scheme 2
Compounds according to subformula Ib
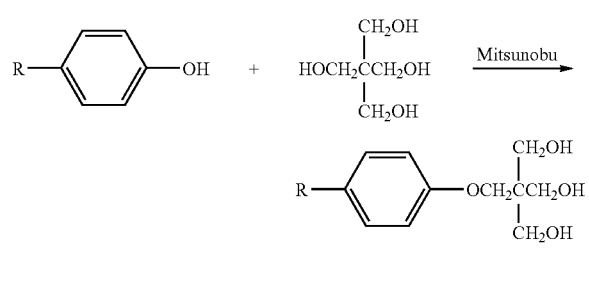
Scheme 3
Compounds according to subformula Ic
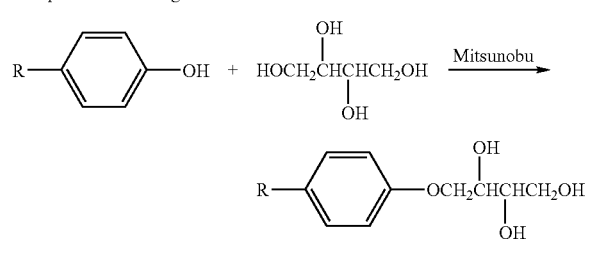
Scheme 4
Compounds according to subformula Id
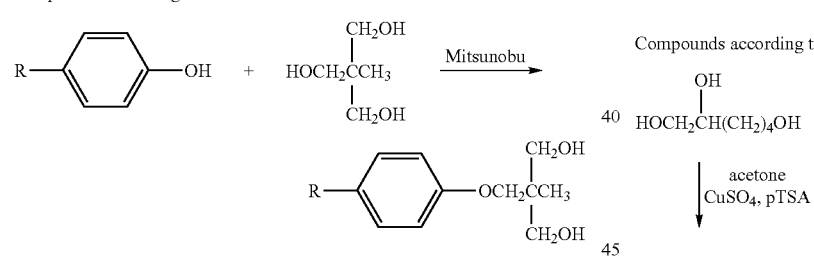
Scheme 5
Compounds according to subformula Ie
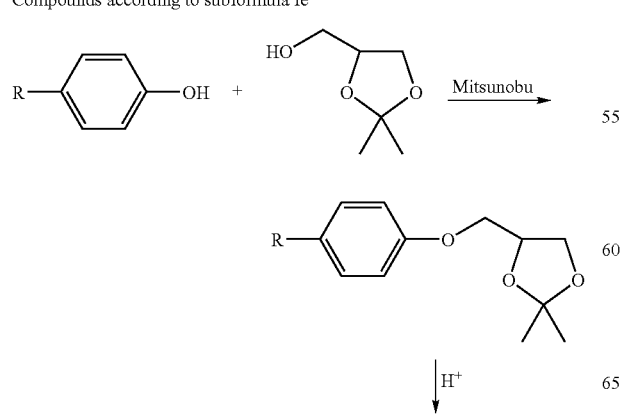
-continued
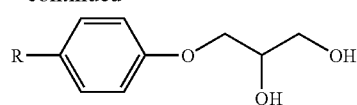
Scheme 6
Compounds according to subformula Ie
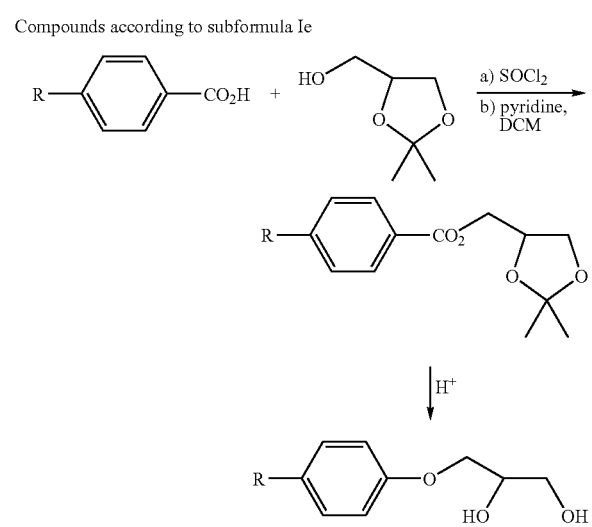
Scheme 7
Compounds according to subformula Ie
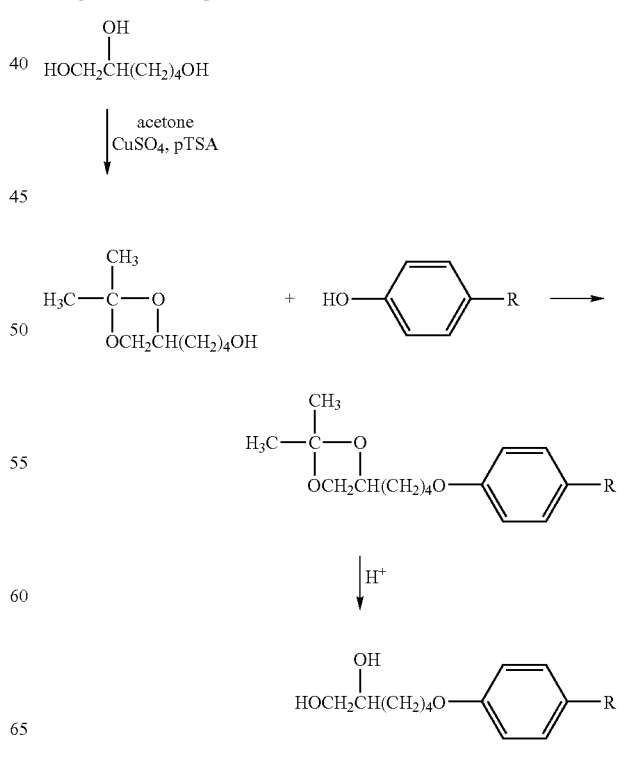

Scheme 8
Compounds according to subformula Ie

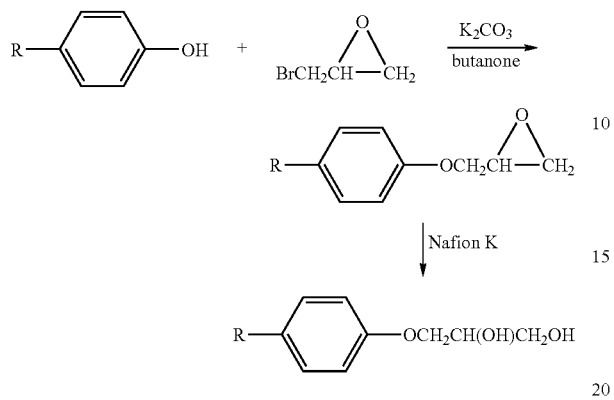

Scheme 9
Compounds according to subformula If

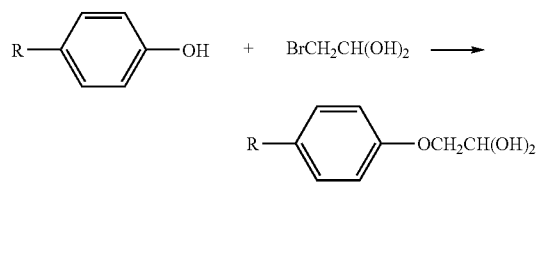

Scheme 10
Compounds according to subformula If

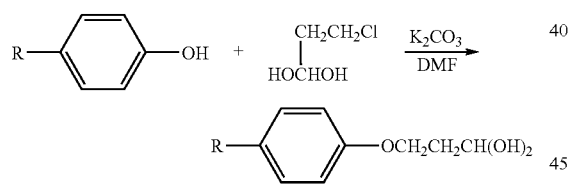

Scheme 11
Compounds according to subformula Ig

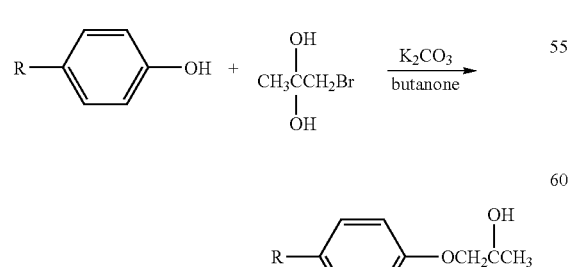

Scheme 12
Compounds according to subformula Ih

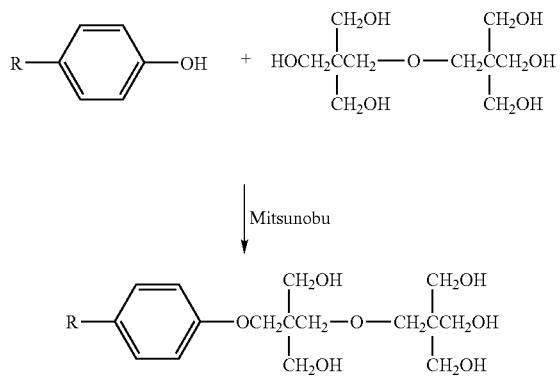

Scheme 13
Compounds according to subformula Ii

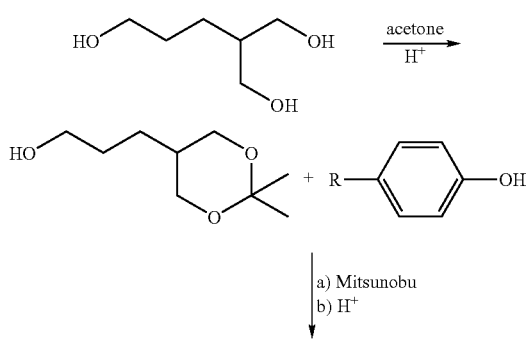

Scheme 14
Compounds according to subformula Ik

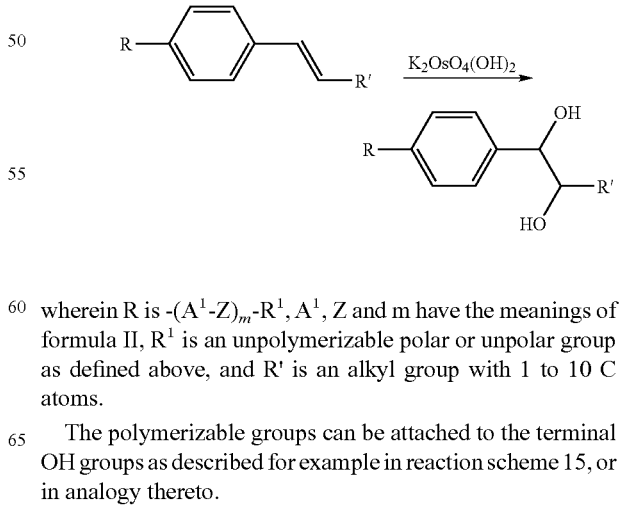

wherein R is $-(A^1-Z)_m-R^1$, $A^1$, Z and m have the meanings of formula II, $R^1$ is an unpolymerizable polar or unpolar group as defined above, and R' is an alkyl group with 1 to 10 C atoms.

The polymerizable groups can be attached to the terminal OH groups as described for example in reaction scheme 15, or in analogy thereto.

Scheme 15

Compounds according to subformula Ie

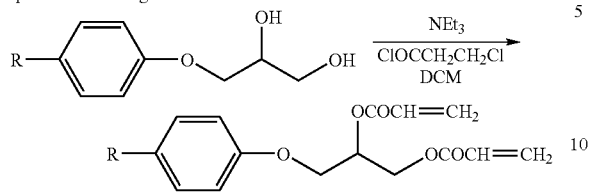

An exemplary method of preparing inventive compounds wherein MG is selected of formula II is given in reaction scheme 16 below.

wherein $R^1$ is an unpolymerizable polar or unpolar group as defined above, Z and m have the meaning of formula II, A and B are each independently Phe, PheL or Cyc as defined above, and L has one of the meanings given above.

The invention also relates to a polymerizable liquid crystal composition comprising at least two polymerizable components, at least one of which is a compound of formula I, and to linear or crosslinked polymers prepared from the inventive compounds and compositions.

Suitable polymerizable mesogenic compounds that can be used as co-components of the polymerizable liquid crystal composition, together with the inventive compounds of for

Scheme 16

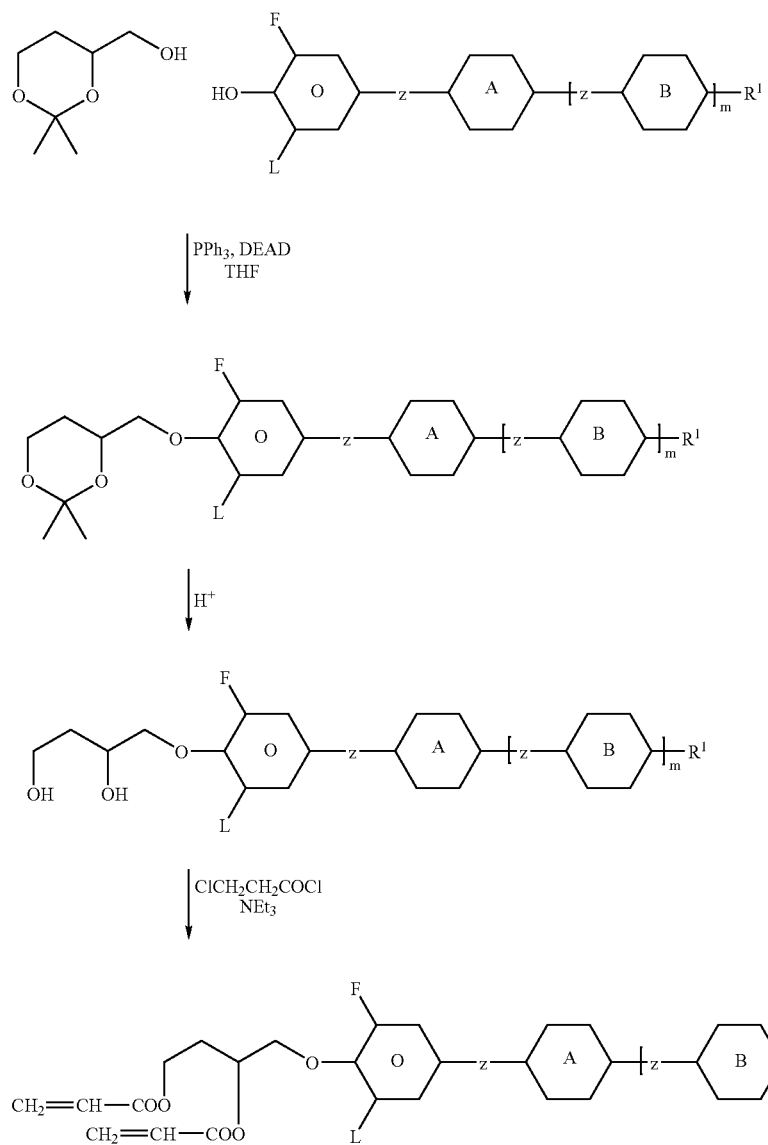

mula I, are disclosed for example in WO 93/22397; EP 0,261, 712; DE 195,04,224; WO 95/22586 and WO 97/00600. The compounds disclosed in these documents, however, are to be regarded merely as examples that shall not limit the scope of this invention.

Typical examples representing such polymerizable mesogenic compounds are shown in the following list of compounds, which should, however, be taken only as illustrative and is in no way intended to restrict, but instead to explain the present invention:

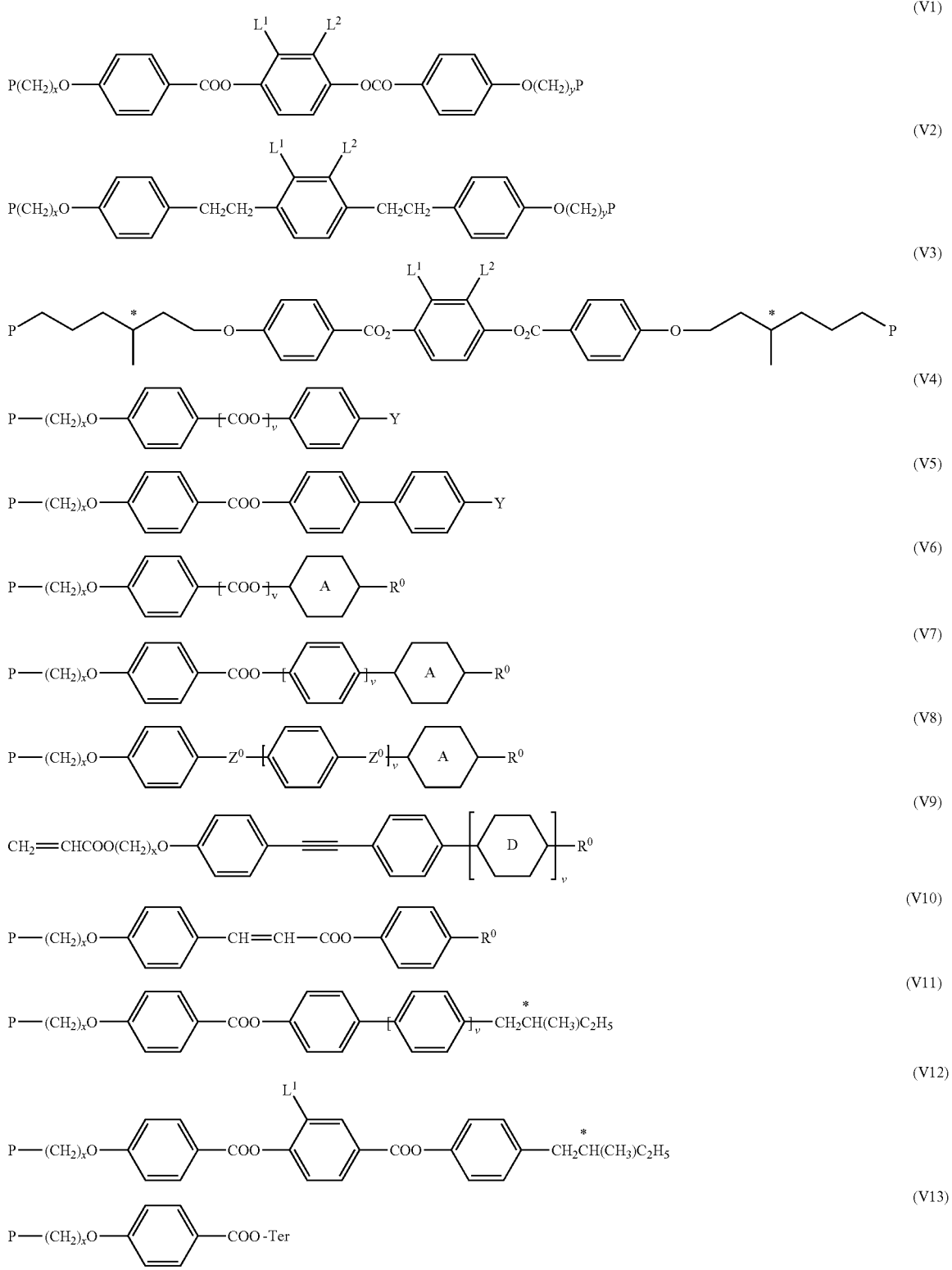

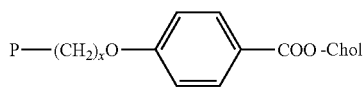

(V14)

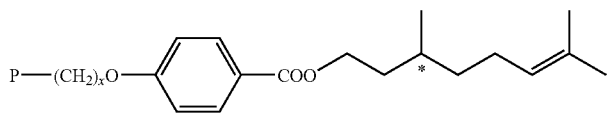

(V15)

In the above formulae, P has one of the meanings of formula I and its preferred meanings as mentioned above, x and y are each independently 1 to 12, A and D are 1,4-phenylene or 1,4-cyclohexylene, v is 0 or 1, $Z^0$ is —COO—, —OCO—, —CH$_2$CH$_2$— or a single bond, Y is a polar group, $R^0$ is an unpolar alkyl or alkoxy group, Ter is a terpenoid radical like e.g. menthyl, Chol is a cholesteryl group, and $L^1$ and $L^2$ are each independently H, F, Cl, CN or an optionally halogenated alkyl, alkoxy or carbonyl or group with 1 to 7 C atoms.

In a preferred embodiment of the invention the polymerizable liquid crystalline composition comprises at least one multireactive compound of formula I and at least one mono- or direactive polymerizable compound, i.e. a mesogenic compound having one or two polymerizable groups. Especially preferred are monoreactive compounds selected of formulae V4 to V15 and direactive compounds selected of formulae V1, V2 and V3 above.

It is also possible for the inventive polymerizable liquid crystalline composition to comprise one or more non-polymerizable chiral compounds, which may be mesogenic or non-mesogenic, in addition or alternatively to chiral polymerizable compounds. For example, commercially available dopants, like e.g. S 811, R 1011 or CB 15 (from Merck KGaA, Germany) can be used for this purpose.

Especially preferred are chiral non-polymerizable dopants with a high helical twisting power (HTP) selected of formula VII

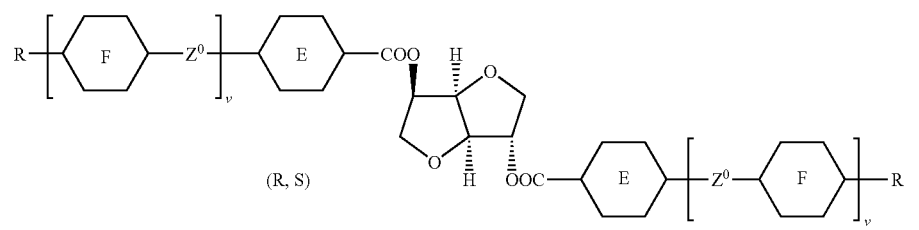

VII and/or formula VIII

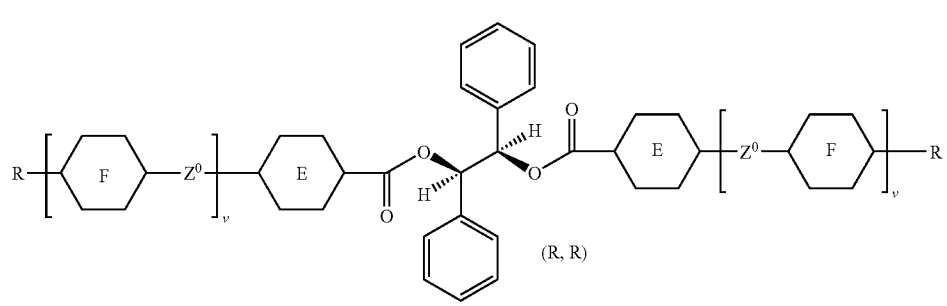

VIII including the (R,S), (S,R), (R,R) and (S,S) enantiomers not shown, wherein E and F are each independently 1,4-phenylene or trans-1,4-cyclohexylene, v is 0 or 1, $Z^o$ is —COO—, —OCO—, —CH$_2$CH$_2$— or a single bond, and R is alkyl, alkoxy or alkanoyl with 1 to 12 C atoms.

The compounds of formula VII and their synthesis are described in WO 98/00428. The compounds of formula VIII and their synthesis are described in GB 2,328,207.

Polymerizable liquid crystalline compositions are preferred that comprise 1 to 6, preferably 1 to 3 compounds of formula I.

In a preferred embodiment of the present invention the polymerizable liquid crystalline composition comprises 1 to 80% by weight, preferably 2 to 60%, in particular 5 to 50% by weight of one or more compounds of formula I.

Particularly preferred are polymerizable compositions comprising a1) 5 to 80%, very preferably 10 to 50% by weight of up to five, preferably one or two compounds of formula I, a2) 5 to 90%, very preferably 10 to 40% by weight of up to five, preferably one, two or three monoreactive mesogenic compounds, b) 0 to 25%, very preferably 1 to 10% by weight of a direactive polymerizable mesogenic compound, c) 0.5 to 10%, very preferably 1 to 7% by weight of a polymerization initiator, d) 0 to 5%, very preferably 0.1 to 2% by weight of a surfactant.

The compounds of component a2) are preferably selected from the above formulae V4 to V15, in particular from formulae V4 to V10.

The compounds of component b) are preferably selected from the above formula V1 and V2.

The term polar group as used in the foregoing and the following means a group selected from halogen, CN, NO$_2$, OH, OCH$_3$, OCN, SCN, an optionally fluorinated carbonyl or carboxyl group with up to 4 C atoms or a mono- oligo- or polyfluorinated alkyl or alkoxy group with 1 to 4 C atoms. Especially preferred polar groups are those as defined for $Y^1$ in formula I, including its preferred meanings.

The term unpolar group means an alkyl group with 1 or more, preferably 1 to 12 C atoms or an alkoxy group with 2 or more, preferably 2 to 12 C atoms.

Liquid crystalline polymers can be obtained from the inventive polymerizable compounds and compositions e.g. by solution polymerization or by in-situ polymerization.

For example, solution polymerization can be carried out in a solvent like dichloromethane, tetrahydrofuran or toluene using AIBN as an initiator and heating for 24 hours at 30 to 60° C.

The in-situ polymerization of polymerizable liquid crystalline compounds and compositions is described in detail by D. J. Broer et al., Makromol. Chem. 190, 2255ff. and 3202ff. (1989).

The polymerizable liquid crystal compounds and compositions according to this invention are preferably polymerized in situ as described in the foregoing and the following.

The inventive compounds and polymerizable liquid crystalline compositions are particularly useful for the preparation of anisotropic polymer films, such as nematic or cholesteric polymer films, with uniform molecular orientation.

Thus, another object of the invention is an anisotropic polymer film with an oriented liquid crystalline phase that is obtainable by polymerizing a polymerizable liquid crystalline composition comprising at least one compound of formula I.

To prepare an anisotropic polymer film with uniform orientation, an inventive polymerizable mesogenic composition is preferably coated onto a substrate, aligned and polymerized in situ by exposing them to heat or actinic radiation. Alignment and curing are preferably carried out in the liquid crystalline phase of the composition.

Actinic radiation means irradiation with light, like UV light, IR light or visible light, irradiation with X-rays or gamma rays or irradiation with high energy particles, such as ions or electrons. As a source for actinic radiation for example a single UV lamp or a set of UV lamps can be used. Another possible source for actinic radiation is a laser, like e.g. a UV laser, an IR laser or a visible laser.

When polymerizing by means of UV light, for example a photoinitiator can be used that decomposes under UV irradiation to produce free radicals or ions that start the polymerization reaction.

It is also possible to use a cationic photoinitiator, when curing reactive mesogens with for example vinyl and epoxide reactive groups, that photocures with cations instead of free radicals.

As a photoinitiator for radical polymerization for example the commercially available Irgacure 651, Irgacure 184, Darocure 1173 or Darocure 4205 (all from Ciba Geigy AG) can be used, whereas in case of cationic photopolymerization the commercially available UVI 6974 (Union Carbide) can be used.

Preferably the polymerizable liquid crystalline composition comprises 0.01 to 10%, in particular 0.05 to 8%, very preferably 0.1 to 5% by weight of a photoinitiator, especially preferably a UV-photoinitiator.

In addition to the components mentioned above, the polymerizable composition may also comprise one or more other suitable components such as e.g. catalysts, stabilizers, chain-transfer agents, co-reacting monomers or surface-active compounds. In particular the addition of stabilizers is preferred in order to prevent undesired spontaneous polymerization of the polymerizable material e.g. during storage.

As stabilizers in principal all compounds can be used that are known to the skilled in the art for this purpose. These compounds are commercially available in a broad variety. Typical examples for stabilizers are 4-ethoxyphenol or butylated hydroxytoluene (BHT).

Other additives, like e.g. chain transfer agents, can also be added to the polymerizable material in order to modify the physical properties of the inventive polymer film. When adding a chain transfer agent, such as monoreactive thiol compounds like e.g. dodecane thiol or multireactive thiol compounds like e.g. trimethylpropane tri(3-mercaptopropionate), to the polymerizable material, the length of the free polymer chains and/or the length of the polymer chains between two crosslinks in the inventive polymer film can be controlled. When the amount of the chain transfer agent is increased, the polymer chain length in the obtained polymer film is decreasing.

It is also possible, in order to increase crosslinking of the polymers, to add up to 20% of a non-mesogenic compound with two or more polymerizable functional groups to the polymerizable composition alternatively or additionally to di- or multireactive mesogenic compounds.

Typical examples for direactive non-mesogenic monomers are alkyldiacrylates or alkyldimethacrylates with alkyl groups of 1 to 20 C atoms. Typical examples for non mesogenic monomers with more than two polymerizable groups are trimethylpropanetrimethacrylate or pentaerythritoltetraacrylate.

In a preferred embodiment of the invention the polymerization of the polymerizable composition is carried out under an atmosphere of inert gas, preferably under a nitrogen atmosphere.

As a substrate for example a glass or quartz sheet as well as a plastic film or sheet can be used. It is also possible to put a second substrate on top of the coated mixture prior to, during and/or after polymerization. The substrates can be removed after polymerization or not. When using two substrates in case of curing by actinic radiation, at least one substrate has to be transmissive for the actinic radiation used for the polymerization.

Isotropic or birefringent substrates can be used. In case the substrate is not removed from the polymerized film after polymerization, preferably isotropic substrates are used.

Preferably at least one substrate is a plastic substrate such as for example a film of polyester such as polyethyleneterephthalate (PET), of polyvinylalcohol (PVA), polycarbonate (PC) or triacetylcellulose (TAC), especially preferably a PET film or a TAC film. As a birefringent substrate for example an uniaxially stretched plastic film can be used. For example PET films are commercially available from ICI Corp. under the trade name Melinex.

In a preferred embodiment of the present invention, the inventive polymerizable composition is coated as a thin layer on a substrate or between two substrates and is aligned in its liquid crystal phase to give a uniform orientation.

A uniform orientation can be achieved for example by shearing the mixture, e.g. by means of a doctor blade. It is also possible to apply an alignment layer, for example a layer of rubbed polyimide or sputtered $SiO_x$, on top of at least one of the substrates. In some cases, the mixtures orient themselves spontaneously on the substrate, or good alignment is achieved already by the act of coating the mixture.

In another preferred embodiment, a second substrate is put on top of the coated material. In this case, the shearing caused by putting together the two substrates is sufficient to give good alignment. It is also possible to apply electric or magnetic fields to align the coated mixture.

The polymerizable composition according to the present invention may also comprise one or more surfactants to improve planar alignment. Suitable surfactants are described for example in J. Cognard, Mol. Cryst. Liq. Cryst. 78, Supplement 1, 1-77 (1981). Particularly preferred are non-ionic surfactants, such as the commercially available fluorocarbon surfactants Fluorad 171 (from 3M Co.), or Zonyl FSN (from DuPont). Preferably the polymerizable mixture comprises 0.01 to 5%, in particular 0.1 to 3%, very preferably 0.2 to 2% by weight of surfactants.

In some cases it is of advantage to apply a second substrate not only to aid alignment of the polymerizable mixture but also to exclude oxygen that may inhibit the polymerization. Alternatively the curing can be carried out under an atmosphere of inert gas. However, curing in air is also possible using suitable photoinitiators and high lamp power. When using a cationic photoinitiator oxygen exclusion most often is not needed, but water should be excluded.

For the preparation of anisotropic polymer gels, e.g. for use in switchable liquid crystal display devices, the polymerizable compounds or compositions can be polymerized in situ as described above, however, in this case alignment of the polymerizable mixture is not necessarily required, although it may be desired for specific applications.

The invention also relates to the use of inventive compounds, compositions and polymers such as polarizers, optical retardation or compensation films, alignment layers, colour filters or holographic elements, in liquid crystal displays such as PDLC, polymer gel or polymer stabilized cholesteric texture (PSCT) displays, in adhesives, synthetic resins with anisotropic mechanical properties, cosmetics, diagnostics or liquid crystal pigments, for decorative and security applications, and for nonlinear optics or optical information storage. Inventive compounds comprising a chiral group can also be used as chiral dopants.

The inventive compounds of formula I are particularly suitable for the preparation of oriented liquid crystal polymer films that can be used as polarization or compensation films in liquid crystal displays.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosure of all applications, patents and publications, cited above and below, and of corresponding European application No. 99 116 849.3, filed Sep. 3, 1999, are hereby incorporated by reference.

EXAMPLES

Without further elaboration, it is believed that one skilled in the art can, using the preceding description, utilize the present invention to its fullest extent. The following examples are, therefore, to be construed as merely illustrative and not limitative of the remainder of the disclosure in any way whatsoever.

In the foregoing and in the following examples, unless otherwise indicated, all temperatures are set forth uncorrected in degrees Celsius and all parts and percentages are by weight.

The following abbreviations are used to illustrate the liquid crystalline phase behaviour of the compounds: K=crystalline; N=nematic; S=smectic; Ch=cholesteric; I=isotropic. The numbers between the symbols indicate the phase transition temperatures in ° C.

Example 1

Compound (1) was prepared as follows according to reaction schemes 6 and 15.

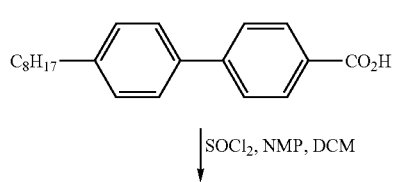

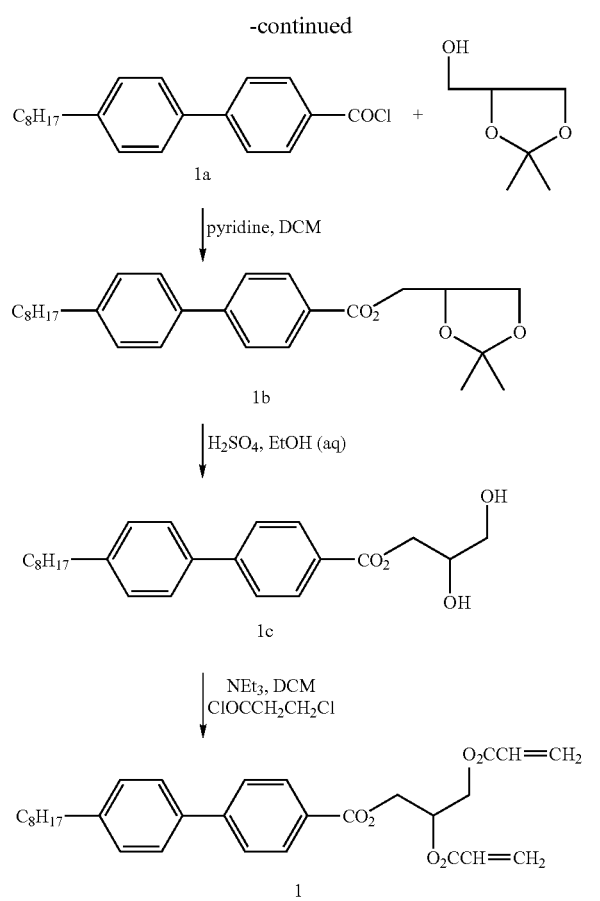

1a)

4'-Octyl-biphenyl-4-carboxylic acid (10.0 g, 32 mmol), thionyl chloride (3.0 ml, 1.3 equiv.) and 2 drops of N-methyl pyrrolidone were stirred under reflux in DCM (100 ml) for 2 hours. The solution was evaporated to dryness on a rotary evaporator. The residual brown oil which solidified on standing was used without further purification in the next step.

1b)

Acid chloride 1a (10.5 g, 32 mmol) was added to a solution of solketal (4.0 ml, 32 mmol) and pyridine (3.1 ml, 1.2 equiv., 38.4 mmol) in DCM (100 ml). The solution was stirred under reflux overnight, cooled to room temperature and evaporated to dryness on a rotary evaporator. The product was purified by flash chromatography (4:1 petroleum ether:ethyl acetate) to leave upon evaporation of the appropriate fractions a yellow oil which solidified on standing. Yield 10.0 g, 95%, melting point 48° C. $^1$H NMR showed the expected signals.

1c)

Acetal 1b (10.0 g, 23.6 mmol) was stirred in a solution of aqueous ethanol (150 ml) in the presence of 2 ml conc. sulphuric acid for 2 hours. The solution was cooled, concentrated in vacuo, water was added until a white solid precipitated. The solid was collected by vaccum filtration (4.9 g, 54%). IR (nujol mull) showed a broad O—H stretch at 3500-3200 cm$^{-1}$.

The compound has a smectic phase, with K 91 S$_A$ 114 I.

1)

Diol 1c (4.8 g, 12.5 mmol), 3-chloropropionyl chloride (2.4 ml, 25 mmol) and triethylamine (10.5 ml, 75 mmol) were dissolved in DCM (50 ml) and stirred at 35° C. for 16 hours. The solution was cooled, washed with water, dried (Na$_2$SO$_4$) evaporated to dryness. The residual oil was purified by flash column chromatography to leave an oil which crystallized on standing. Yield 5.3 g, 88%. $^1$H NMR gave the expected signals.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A multireactive polymerizable mesogenic compound of formula I $$R^1\text{-MG-}R^2 \qquad\qquad I$$

wherein:

R$^1$ is halogen, CN, OCN, NCS, NO$_2$ or an alkyl radical with 1 to 30 C atoms which may be unsubstituted, mono- or polysubstituted by halogen or CN, optionally one or more non-adjacent CH$_2$ groups being replaced, in each case independently from one another, by —O—, —S—, —NH—, —N(CH$_3$)—, —CO—, —COO—, —OCO—, —OCO—O—, —S—CO—, —CO—S—, —CH═CH— or —C≡C— in such a manner that oxygen atoms are not linked directly to one another, or alternatively has one of the meanings of R$^2$ or is P-(Sp-X)$_n$—;

P is a polymerizable group;

Sp is a spacer group with 1 to 25 C atoms;

X is —O—, —S—, —CO—, —COO—, —OCO—, —OCO—O—, —CO—NH—, —NH—CO—, —OCH$_2$—, —CH$_2$O—, —SCH$_2$—, —CH$_2$S—, —CH═CH—COO—, —OOC—CH═CH— or a single bond;

n is 0 or 1;

MG is a mesogenic group of formula VI $$-(A^1-Z)_d\text{-G-}(Z-A^2)_e- \qquad\qquad VI$$

wherein

Z is —O—, —S—, —CO—, —COO—, —OCO—, —CO—NH—, —NH—CO—, —CH$_2$CH$_2$—, —OCH$_2$—, —CH$_2$O—, —SCH$_2$—, —CH$_2$S—, —CH═CH—, —CH═CH—COO—, —OCO—CH═CH—, —C≡C— or a single bond, A$^1$ and A$^2$ are each independently 1,4-phenylene in which, in addition, one or more CH groups are optionally replaced by N; 1,4-cyclohexylene in which, in addition, one or two non-adjacent CH$_2$ groups are optionally replaced by O and/or S; 1,4-cyclohexenylene; 1,4-bicyclo(2,2,2)octylene; piperidine-1,4-diyl; naphthalene-2,6-diyl; decahydronaphthalene-2,6-diyl; or 1,2,3,4-tetrahydro-naphthalene-2,6-diyl; all these groups optionally being unsubstituted, mono- or polysubstituted with F, Cl, OH, CN, NO$_2$ or alkyl, alkoxy, alkylcarbonyl or alkoxycarbonyl groups having 1 to 7 C atoms wherein one or more H atoms may be substituted by F or Cl, and d and e are independently of each other 0, 1 or 2, and G is a bivalent chiral group; and R$^2$ is alkyl with 1 to 25 C atoms which may be unsubstituted, mono- or polysubstituted by halogen or CN, optionally one or more non-adjacent CH$_2$ groups being replaced, in each case independently from one another, by —O—, —S—, —NH—, —N(CH$_3$)—, —CO—, —COO—, —OCO—, —OCO—O—, —S—CO—, —CO—S—, —CH═CH— or —C≡C— in such a manner that oxygen atoms are not linked directly to one another, and which is substituted with at least two identical or different groups P.

2. The compound of claim 1, wherein P is a polymerizable group selected from CH$_2$═CW—COO—, WCH═CH—O—, CH$_2$═CH-Phenyl-(O)$_k$— and

with W being H, CH$_3$ or Cl and k being 0 or 1.

3. The compound of claim 1, wherein G is a chiral bivalent radical derived from a sugar, a binaphthyl compound or an optically active glycol.

4. The compound of claim 1, wherein G is a dianhydrohexitol group.

5. The compound of claim 1, wherein G is an ethane-1,2-diol group substituted in 1- and/or 2-position with an alkyl or aryl group or groups.

6. The compound of claim 1, wherein G is an optionally substituted binaphthyl group.

7. The compound of claim 1, wherein G is a group selected from the following groups:

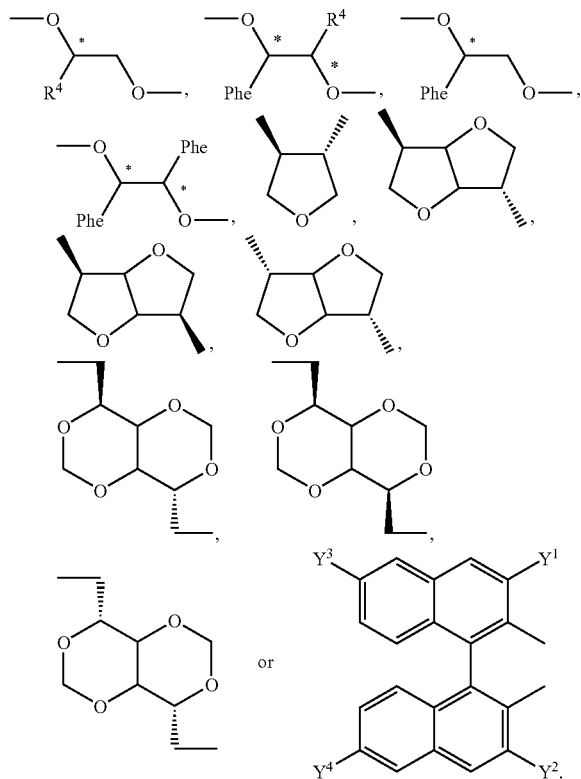

wherein Phe is 1,4-phenylene, R$^4$ is F or optionally fluorinated alkyl with 1 to 4 C atoms, and Y$^1$, Y$^2$, Y$^3$ and Y$^4$ are each independently is halogen, CN, OCN, NCS, NO$_2$ or an alkyl radical with 1 to 30 C atoms which may be unsubstituted, mono- or polysubstituted by halogen or CN, optionally one or more non-adjacent CH$_2$ groups being replaced, in each case independently from one another, by —O—, —S—, —NH—, —N(CH$_3$)—, —CO—, —COO—, —OCO—, —OCO—O—, —S—CO—, —CO—S—, —CH═CH— or —C≡C— in such a manner that oxygen atoms are not linked directly to one another.

8. A compound according to claim 1, wherein R$^1$ is not a polymerizable group.

9. A compound according to claim 1, wherein R$^1$ has one of the meanings of R$^2$.

10. A compound according to claim 1, wherein R$^2$ is a group of one of the following formulae:

| | |
|---|---|
| —X-alkyl-CHP$^1$—CH$_2$—CH$_2$P$^2$ | Ia |
| —X-alkyl-C(CH$_2$P$^1$)(CH$_2$P$^2$)—CH$_2$P$^3$ | Ib |
| —X-alkyl-CHP$^1$CHP$^2$—CH$_2$P$^3$ | Ic |
| —X-alkyl-C(CH$_2$P$^1$)(CH$_2$P$^2$)—C$_a$H$_{2a+1}$ | Id |
| —X-alkyl-CHP$^1$—CH$_2$P$^2$ | Ie |
| —X-alkyl-CHP$^1$P$^2$ | If |
| —X-alkyl-CP$^1$P$^2$—C$_a$H$_{2a+1}$ | Ig |
| —X-alkyl-C(CH$_2$P$^1$)(CH$_2$P$^2$)—CH$_2$OCH$_2$—C(CH$_2$P$^3$)(CH$_2$P$^4$)CH$_2$P$^5$ | Ih |
| —X-alkyl-CH((CH$_2$)$_a$P$^1$)((CH$_2$)$_b$P$^2$) | Ii |
| —X-alkyl-CHP$^1$CHP$^2$—C$_a$H$_{2a+1}$ | Ik | wherein alkyl is alkylene with 1 to 12 C atoms which may be unsubstituted, mono- or polysubstituted by halogen or CN, one or more non-adjacent CH$_2$ groups optionally being replaced, in each case independently from one another, by —O—, —S—, —NH—, —N(CH$_3$)—, —CO—, —COO—, —OCO—, —OCO—O—, —S—CO—, —CO—S—, —CH═CH— or —C≡C— in such a manner that oxygen atoms are not linked directly to one another, a and b are identical or different integers from 0 to 6, X has one of the meanings given in formula I, and P$^1$ to P$^5$ independently have one of the meanings of P given in formula I.

11. A compound according to claim 1, wherein each P is independently of each other acrylate, methacrylate, vinyl, vinyloxy, epoxy or p-vinylphenyloxy.

12. A compound according to claim 1, wherein Sp is an alkylene group having 1 to 20 C atoms, in which one or more non-adjacent CH$_2$ groups are optionally replaced by —O—, —S—, —NH—, —N(CH$_3$)—, —CO—, —O—CO—, —S—CO—, —O—COO—, —CO—S—, —CO—, —CH(halogen), —CH(CN)—, —CH═CH— or —C≡C—.

13. A compound according to claim 1, wherein R$^1$ is a chiral alkyl radical with 1 to 30 C atoms which may be unsubstituted, mono- or polysubstituted by halogen or CN, optionally one or more non-adjacent CH$_2$ groups being replaced, in each case independently from one another, by —O—, —S—, —NH—, —N(CH$_3$)—, —CO—, —COO—, —OCO—, —OCO—, —S—CO—, —CO—S—, —CH═CH— or —C≡C— in such a manner that oxygen atoms are not linked directly to one another, provided that sufficient C atoms and substituents or replacements are provided to provide a chiral group.

14. A polymerizable mesogenic composition comprising at least two components, wherein at least one component is a compound of formula I of claim 1.

15. A linear or crosslinked polymer obtained by polymerizing a polymerizable mesogenic compound of formula I of claim 1.

16. A linear or crosslinked polymer obtained by polymerizing a polymerizable mesogenic composition according to claim 14.

17. A polarizer, optical retardation or compensation film, alignment layer, colour filter, holographic element, liquid crystal display, PDLC, polymer gel, polymer stabilized cholesteric texture (PSCT) display, adhesive, synthetic resin with anisotropic mechanical properties, cosmetic, diagnostic, liquid crystal pigment for decorative and/or security applications, or article for nonlinear optics or optical information storage comprising a compound of the formula I of claim 1.

18. A polarizer, optical retardation or compensation film, alignment layer, colour filter, holographic element, liquid crystal display, PDLC, polymer gel, polymer stabilized cholesteric texture (PSCT) display, adhesive, synthetic resin with anisotropic mechanical properties, cosmetic, diagnostic, liquid crystal pigment for decorative and/or security applications, or article for nonlinear optics or optical information storage comprising a composition according to claim 14.

19. A polarizer, optical retardation or compensation film, alignment layer, colour filter, hologrphic element, liquid crystal display, PDLC, polymer gel, polymer stabilized cholesteric texture (PSCT) display, adhesive, synthetic resin with anisotropic mechanical properties, cosmetic, diagnostic, liquid crystal pigment for decorative and/or security applications, or article for nonlinear optics or optical information storage comprising a polymer according to claim 15.

* * * * *

UNITED STATES PATENT AND TRADEMARK OFFICE
CERTIFICATE OF CORRECTION

PATENT NO.      : 7,534,474 B2
APPLICATION NO. : 11/517300
DATED           : May 19, 2009
INVENTOR(S)     : Farrand et al.

It is certified that error appears in the above-identified patent and that said Letters Patent is hereby corrected as shown below:

Column 30, line 23 reads "or polysubstituted by halogen or CN, optionally one or" should read -- or polysubstituted by halogen or CN, and wherein optionally one or --.

Column 31, line 67 reads "CN, optionally one or more non-adjacent $CH_2$ groups" should read -- CN, and wherein optionally one or more non-adjacent $CH_2$ groups --.

Column 32, line 1 reads "being replaced, in each case independently from one" should read -- are replaced, in each case independently from one --.

Column 32, line 36 reads "CN, one or more non-adjacent $CH_2$ groups optionally" should read -- CN, and wherein one or more non-adjacent $CH_2$ groups optionally --.

Column 32, line 37 reads "being replaced, in each case independently from one" should read -- are replaced, in each case independently from one --.

Column 32, line 55 reads "-S-CO-, -O-COO-, -CO-S-, -CO-, -CH" should read -- -S-CO-, -O-COO-, -CO-S-, -CO-O-, -CH --.

Column 32, line 56 reads "(halogen), -CH(CN)-, -CH=CH-or -C≡C-." should read -- (halogen)-, -CH(CN)-, -CH=CH-or -C≡C-. --.

Column 32, line 59 reads "unsubstituted, mono-or polysubstituted by halogen or CN," should read -- unsubstituted, mono-or polysubstituted by halogen or CN, and wherein --.

Column 32, line 60 reads "optionally one or more non-adjacent $CH_2$ groups being" should read -- optionally one or more non-adjacent $CH_2$ groups are --.

CERTIFICATE OF CORRECTION (continued)
U.S. Pat. No. 7,534,474 B2

Column 32, line 63 reads "-OCO-, -OCO-, -S-CO-, -CO-S-," should read -- -OCO-, -OCO-O-, -S-CO-, -CO-S-, --.

Column 34, line 10 reads "alignment layer, colour filter, hologrphic element, liquid crys-" should read -- alignment layer, colour filter, holographic element, liquid crys- --.

Signed and Sealed this

Sixteenth Day of February, 2010

David J. Kappos
*Director of the United States Patent and Trademark Office*